US005483511A

United States Patent [19]
Jewell et al.

[11] Patent Number: 5,483,511
[45] Date of Patent: Jan. 9, 1996

[54] MULTIPLE BEAM OPTICAL MEMORY SYSTEM WITH SOLID-STATE LASERS

[75] Inventors: Jack L. Jewell, Boulder; Boris J. Muchnik, Denver, both of Colo.

[73] Assignee: Vixel Corporation, Broomfield, Colo.

[21] Appl. No.: 19,141

[22] Filed: Feb. 17, 1993

[51] Int. Cl.$^6$ ................................................. G11B 7/00
[52] U.S. Cl. ..................... 369/44.37; 369/112; 369/44.23
[58] Field of Search ............................. 369/44.37, 44.23, 369/44.24, 109, 110, 112, 124, 44.11, 13, 117, 118, 119, 44.32, 103, 107, 116; 385/33; 250/571

[56] References Cited

U.S. PATENT DOCUMENTS

| | | | |
|---|---|---|---|
| 4,423,495 | 12/1983 | Musha et al. | 369/44.37 |
| 4,520,471 | 5/1985 | Carlin | 369/112 |
| 4,520,472 | 5/1985 | Reno | 369/112 |
| 4,689,781 | 8/1987 | Ando | 369/112 |
| 4,712,887 | 12/1987 | Baer | 350/484 |
| 4,743,091 | 5/1988 | Gelbart | 350/252 |
| 4,779,259 | 10/1988 | Kono et al. | 369/112 |

(List continued on next page.)

FOREIGN PATENT DOCUMENTS

| | | | |
|---|---|---|---|
| 55-113139 | 9/1980 | Japan | 369/44.37 |
| 1-49179 | 2/1989 | Japan | 369/122 |

OTHER PUBLICATIONS

*Optical recording drives diode–laser technology*, Laser Focus World, By Donald B. Carlin, Jul. 1992, pp. 77–84.
*Multitrack rewritable optical disk system for high performance applications: 14-inch TODS*, SPIE vol. 1499 Optical Data Storage '91, pp. 203–208.
"Surface–Emitting Lasers Emerge From The Laboratory", Jack L. Jewell, Laser Focus World, pp. 217–223, May 1992.
"Surface–Emitting Lasers Break The Resistance Barrier", Jack L. Jewell, Gregory P. Olbright, Robert P. Bryan and Axel Scherer. Photonics Spectra, pp. 126–130, Nov. 1992.
"Microlasers", Jack L. Jewell, James P. Harbison, and Axel Scherer, Scientific American, Nov. 1991, vol. 265, No. 5 pp. 86–94.
"Vertical–Cavity Surface–Emitting Lasers: Design, Growth, Fabrication, Characterization", Jack L. Jewell, J. P. Harbison, A. Scherer, Y. H. Lee, and L. T. Florez, IEEE J. Quantum Electron, Jun. 1991, pp. 1332–1346.
"Temperature Dependence of GaAs–AlGaAs Vertical Cavity Surface Emitting Lasers", B. Tell, K. F. Brown–Goebeler, R. E. Leibenguth, F. M. Baez, and Y. H. Lee, Appl. Phys. Lett (60) 6, Feb. 1992, pp. 683–685.
"Optical Recording Drives Diode–Laser Technology", Donald B. Carlin, Laser Focus World, Jul. 1992, pp. 77–84.
"Multitrack Rewritable Optical Disk System For High Performance Applications: 14–inc TODS", Joseph Cinelli, Taras Kozak, SPIE, vol. 1499 Optical Data Storage '91, pp. 203–208.
"Staircase Lens: A Binary And Diffractive Field Curvature Corrector", Jose M. Sasian and Russell A. Chipman, Applied Optics, vol. 32, No. 1, Jan. 1993, pp. 60–66.
"Computational Analysis of A Holographic Optical Head Configuration", Naoyasu Miyagawa, Shinichi Kadowaki, Yoshikazu Hori, and Makoto Kato, Applied Optics, vol. 31, No. 35, Dec. 1992, pp. 7457–7463.
Marchant, A. B., *Optical recording: a technical overview* (Addison–Wesley Pub. Co. 1990), pp. 153, 166–172, 219–224.

Primary Examiner—Georgia Y. Epps
Assistant Examiner—Nabil Hindi
Attorney, Agent, or Firm—Irell & Manella

[57] ABSTRACT

An optical memory system employing multiple reading/writing optical beams from solid state lasers for simultaneously reading from a writing to multiple tracks of optical media to allow reading/writing of closely spaced adjacent tracks, a number a feature are disclosed. These include using vertical writing surface emitting lasers forming an array of beam sources, using lenslets associated with array, modulating the beams, and providing various optical elements and combinations of optical elements to compensate for beam and system imperfections.

18 Claims, 7 Drawing Sheets

U.S. PATENT DOCUMENTS

| | | | |
|---|---|---|---|
| 4,783,776 | 11/1988 | Ishigaki et al. | 369/109 |
| 4,805,162 | 2/1989 | Stahl et al. | 369/44 |
| 4,884,260 | 11/1989 | Bouldin et al. | 369/93 |
| 4,891,790 | 1/1990 | Webster et al. | 365/127 |
| 4,965,780 | 10/1990 | Lee et al. | 369/110 |
| 4,982,395 | 1/1991 | MacNally | 369/44.37 |
| 4,988,153 | 1/1991 | Paek | 369/103 |
| 4,999,842 | 3/1991 | Huang et al. | 372/50 |
| 5,004,326 | 4/1991 | Sasaki | 369/110 |
| 5,007,690 | 4/1991 | Cheon et al. | 369/103 |
| 5,028,802 | 7/1991 | Webb et al. | 250/571 |
| 5,073,041 | 12/1991 | Rastani | 385/33 |
| 5,105,407 | 4/1992 | Ishika | 369/44.37 |
| 5,123,003 | 6/1992 | Noda et al. | 369/44.37 |
| 5,128,919 | 7/1992 | Narahara et al. | 369/44.37 |
| 5,130,965 | 7/1992 | Karaki et al. | 369/44.38 |
| 5,138,592 | 8/1992 | Fujita | 369/44.13 |
| 5,144,616 | 9/1992 | Yasukawa et al. | 369/112 |
| 5,177,724 | 1/1993 | Gelbart | 369/44.16 |
| 5,181,161 | 1/1993 | Hirose et al. | 369/44.37 |
| 5,184,340 | 2/1993 | Kachi et al. | 369/44.37 |
| 5,212,572 | 5/1993 | Krantz et al. | 369/110 |
| 5,303,216 | 4/1994 | Shinoda et al. | 369/44.37 |

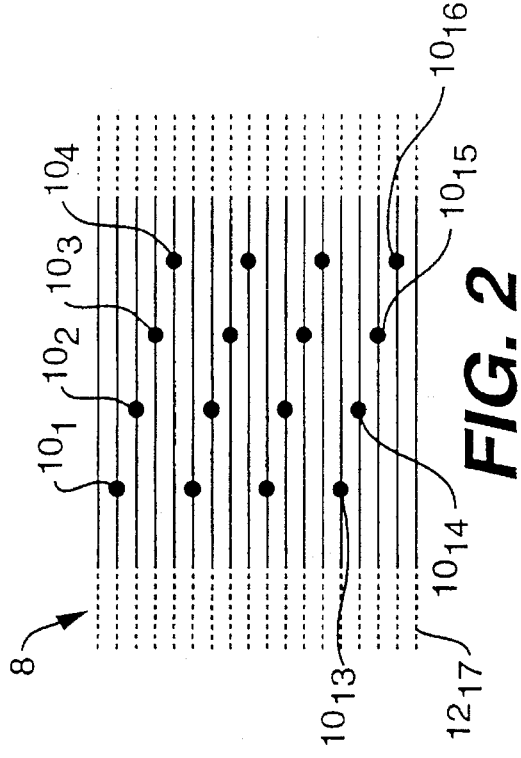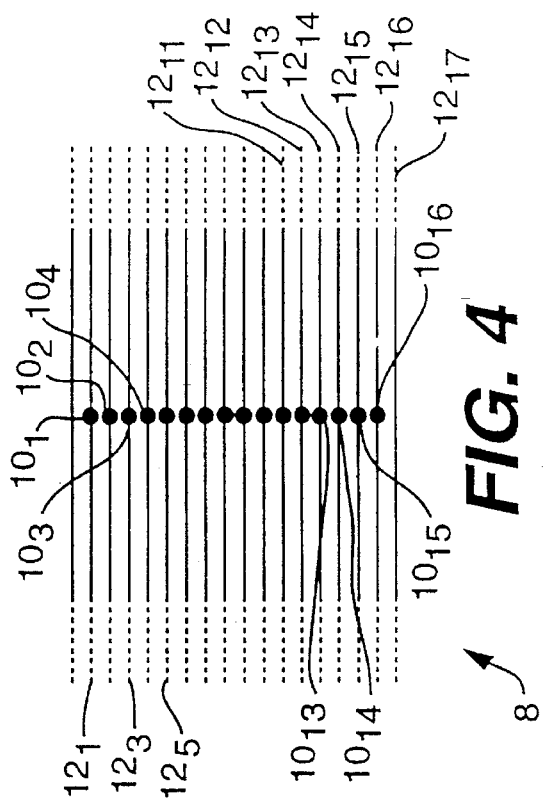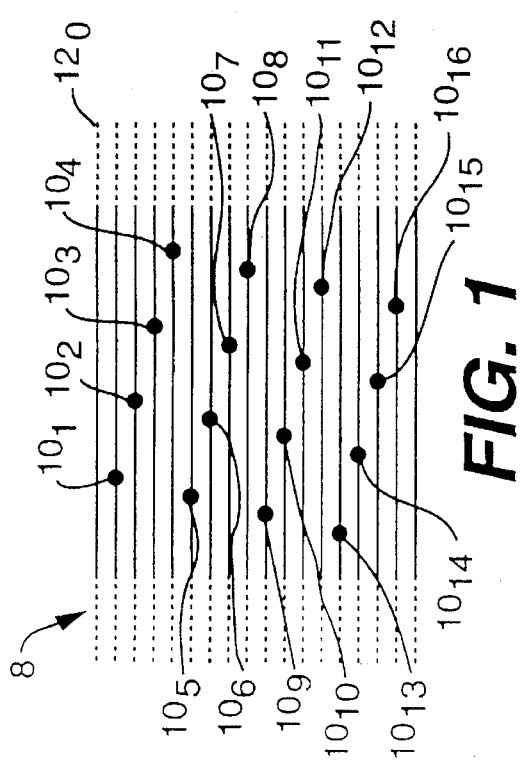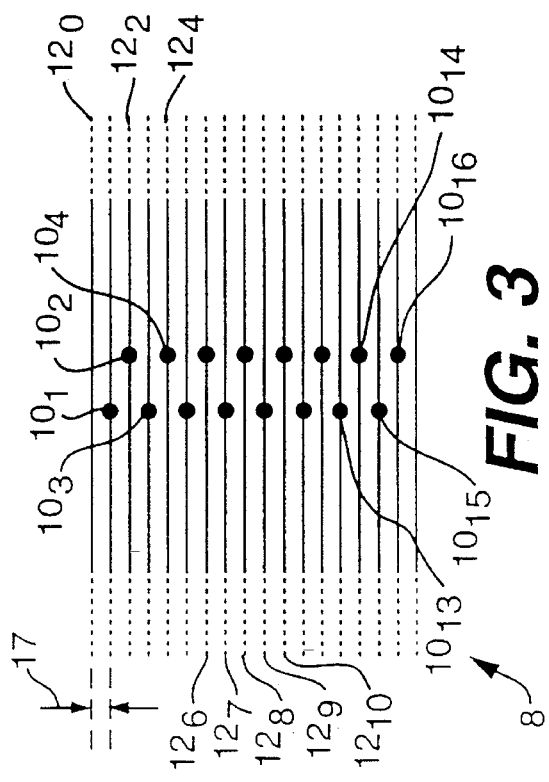

MULTIPLE BEAM OPTICAL MEMORY SYSTEM WITH SOLID-STATE LASERS

RELATED CASE

A commonly-assigned, concurrently-filed application Ser. No. 08/018,943, entitled "Multiple Beam Optical Memory System".

This invention relates to optical memories, and in particular to an optical memory system in which multiple beams simultaneously read information from or write information to multiple tracks of movable storage media and in which readout is performed by an array of detectors. The above identified application is hereby incorporated by reference.

BACKGROUND OF THE INVENTION

Optical memory has been very successful in certain areas, the most prominent being the Compact Disk (CD) involving playback (read only) of musical information. Although rewriteable optical media is being developed, for example phase-change and magneto-optical, other characteristics of optical recording technology have limited its use for computer related applications. One limitation is the rate at which data is read. This rate is limited by the spinning speed of the disk and the fact that only one source/detector i used. The other limitation is access time, or the average time it takes to access a randomly located bit of information. This time is limited by the mechanical motion of the head over large distances along the radius of the disk.

Increase of data rate has been the object of many efforts. One approach, to speed up the rotational rate of the disk, is limited in the fact that the disks already rotate at almost their maximum practical speed. Use of a shorter wavelength source will increase the data rate for a given rotational rate. A factor of 2 reduction in wavelength will increase the areal data density by 4 times; however the linear density, which is relevant to data rate, is only increased 2 times. To accomplish even this modest increase requires development of diode lasers emitting in the near ultraviolet, which will take considerable time.

Use of multiple read sources can increase the data rate by an order of magnitude or more, independently of the other two approaches. Multiple laser sources envisioned thus far have most often been linear, i.e., one-dimensional (1D), arrays of edge-emitting laser diodes. See, for example, the article by Carlin in Laser Focus World, July 1992, pp. 77–84, and by Marchant in "Optical Recording" (Addison-Wesley, Reading, Mass., 1990), both relating to optical disks, and by Bouldin and Drexler, U.S. Pat. No. 4,884,260, relating to optical tape. These systems have the disadvantage of astigmatic elliptical beams resulting from the use of edge-emitting laser diodes. Correcting such beams in an array is difficult. The edge-emitting laser diode geometry also does not allow the use of two-dimensional (2D) arrays, except by splitting the beams by, for example, diffraction gratings. MacAnally in U.S. Pat. No. 4,982,395 describes a composite optical grating which allows the simultaneous reading of 2 adjacent concentric tracks. Marchant also describes experiments conducted with a gas laser using a diffraction grating to produce 9 beams. But this was not a practical system because of the size and the difficulties of firming, aligning, modulating and maintaining of these beams. Moreover, the spacing between the focussed spots was too large to use with conventional CD media. The two referenced publications and the two referenced patents are herein incorporated by reference. None of the prior art known to us describes a practical 2D readout from optical recording media, nor does it describe a practical means for demagnification to make a 1D readout from with 4 or more beams.

SUMMARY OF INVENTION

An object of the invention is an optical memory system providing high data transfer rates and short access time.

A further object of the invention is an improved optical memory system employing multiple beams for simultaneous multiple track reading or writing.

Still another object of the invention is an optical memory system providing multiple beam readout of plural adjacent tracks with minimum crosstalk.

In accordance with one aspect of our invention, we provide in an optical memory system one or more vertical-cavity surface-emitting lasers (VCSEL) providing plural optical beams capable of being focussed on adjacent tracks of the optical media for simultaneous reading of the data incorporated in said adjacent tracks, or writing of data to adjacent tracks.

This aspect of our invention is based on the recognition that VCSELs typically generate circular, astigmatism-free beams, and are easily fabricated in 1D or 2D arrays of beams. As a result, by incorporating VCSELs in the system, a number of significant advantages are achieved:

(1) 1D and 2D arrays with 4 or more lasers in a variety of array geometries and capable of reading from or writing to simultaneously 4 or more tracks are easily obtained.

(2) The individual laser elements in the array can be spaced apart relatively wide distances, thus simplifying fabrication, with a simple optical system provided to focus the multiple beams at the media to produce optical spots with the very close spacings required to read/write adjacent media tracks.

We prefer to form the multiple beams using multiple independently-addressable lasers. In such a case, the beams can be modulated with different frequencies to help reduce crosstalk, with the detector elements in a reading system provided with appropriate electronics to filter out the modulating frequencies.

In accordance with another aspect of the invention, the optical memory system employs a 1D array source of light beams forming a linear array of closely-spaced read or write spots at the optical storage media. In order to realize close spacing of the read/write spots as would be required for reading from or writing to adjacent closely-spaced tracks of the media, each of the light beams is associated with a lenslet at the beam source. Preferably, the lenslets are integrated with their respective laser source. The provision of the lenslets not only provide sufficient demagnification of the array of beams, so that they can be more widely spaced at their source thereby greatly simplifying fabrication, but also provide additional means to compensate for various beam aberrations or distortions to improve beam focusing and tracking at the media.

In accordance with still another aspect of the invention, the light beams from their source comprise a 2D array of at least 4 beams. This, again, offers the benefits of allowing wider spacing at the source where the beams are generated or formed, yet providing closely-spaced read/write spots at the media. In addition, this geometry also allows compensation for beam distortions to insure proper beam focussing and tracking out the media.

In accordance with still another aspect of the invention, an optical system is provided for causing the multiple beams to focus on and track multiple traces of the media. A feature is the incorporation in the head of means for compensating for certain inherent optical defects which make it extremely difficult to form on the media closely-spaced focussed spots that retain their focussed condition and spacing as the head scans along the tracks.

The above and further objects, details and advantages of the present invention will become apparent from the following detailed description of preferred embodiments thereof, when read in conjunction with the accompanying drawings.

BRIEF DESCRIPTION OF THE DRAWINGS

FIGS. 1–4 schematically illustrate various beam spot arrays on optical media for multiple reading/writing in accordance with the invention;

DETAILED DESCRIPTION OF THE PREFERRED EMBODIMENTS

Figure 5:
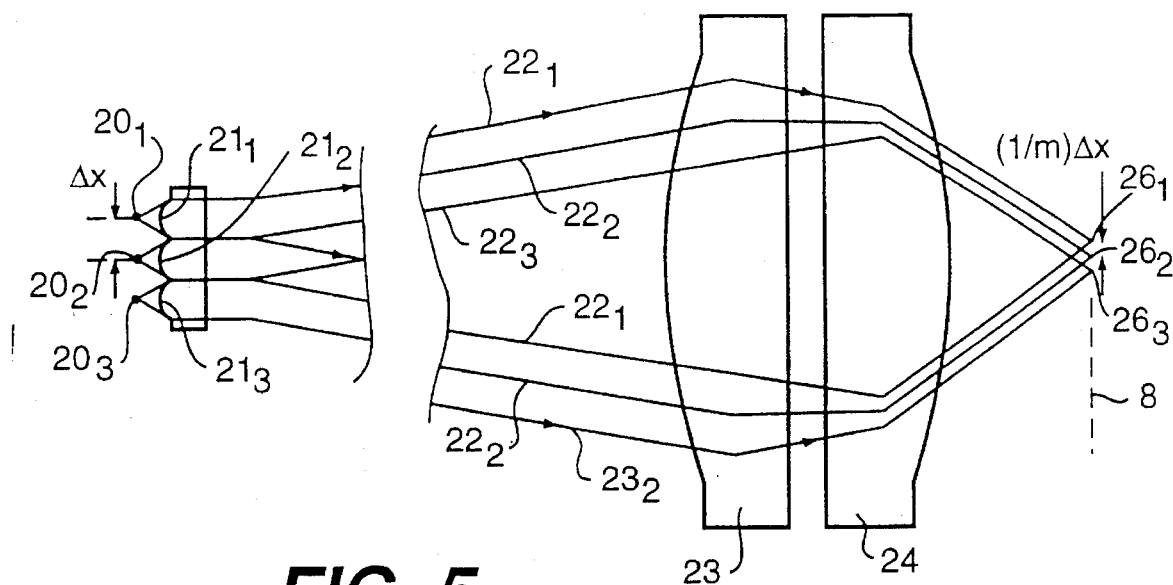
FIG. 5 schematically illustrates one way in accordance with the invention to form multiple reading/writing spots.

Laser arrays for various purposes using VCSELs have been reported in the literature. To improve performance, diffractive microlenslets were integrated into the semiconductor substrate in which the VCSELs were built. That is to say, each emitted beam was individually focussed by its own lenslet.

In accordance with an aspect of our optical memory invention, we use a 1D or 2D array of VCSELs imaged through a conventional (single macrolens) optical system. The reasoning is manyfold as follows. Optical disk systems typically have a 2 mm working distance from the lens to the media. Since the focusing lens is of high numerical aperture (NA), its diameter must be a few mm also. Thus the concept of having an individual microlens for each laser must either have a very short working distance or very large separations between lasers. The only way to achieve a long working distance and small spacings is to image an array through a single lens. For a given optical magnification and use of a single lens, a given number of elements is most effectively imaged when configured in a 2-D array. Otherwise the elements are very far off the optical axis.

A square arrangement of beam spots focussed on a media plane and produced by an array of individual laser elements integrated onto a common substrate is schematically illustrated in FIG. 1. The beam spot of each laser is shown as a round dot on media designated 8. Spots from 16 VCSEL lasers are shown, referenced $10_1$— $10_1$. The horizontal lines shown represent schematically the tracks on the optical media 8 and are referenced $12_0$–$12_{17}$, and are provided to illustrate the geometry of the spot array relative to the tracks. This geometry we denote as a square arrangement. To simplify the illustrations, the same reference numbers refer to the same elements, and to avoid excessive clutter, some of the reference numerals do not appear on all the figures. For example, the complete listing of track references only appears in FIGS. 3 and 4, but are the same for FIGS. 1 and 2. The square is tilted with respect to the recording tracks with an angle such that each adjacent element $10_1$–$10_{16}$ addresses an adjacent track $12_1$–$12_{16}$. The first element of the array of lasers, on the following scan (not shown), addresses the next adjacent track $12_{17}$. Some of the laser elements may be eliminated without losing continuity in addressing the recording tracks. For example, the uppermost $10_1$ and/or lowermost $10_{16}$ elements can be eliminated. Some entire rows can also be eliminated to form a rectangular-shaped array. A very similar oblique arrangement of laser spots $10_1$–$10_{16}$ can also be constructed as shown in FIG. 2. A special case of the oblique array can be viewed as two parallel linear subarrays, with one subarray being offset from the other by one track pitch distance. This is shown in FIG. 3, with the laser element spots again designated $10_1$–$10_{16}$, and the track pitch designated 17. Although the preferred embodiments address adjacent tracks of the recording medium, in some cases it can be advantageous to address tracks in a non-adjacent geometry.

A further feature of our invention is to implement a linear array with many elements addressing adjacent tracks. This is illustrated in FIG. 4, with the laser element spots again designated $10_1$–$10_{16}$. The prior art is only able to achieve addressing of non-adjacent tracks, or addressing of only a few adjacent tracks, or addressing of many adjacent tracks only through use of complex, heavy and expensive focusing lenses. The prior art address adjacent tracks with array orientations nearly parallel to the tracks, when more than 2 beams are used, rather than the nearly perpendicular orientation shown in FIGS. 3 and 4. Note that, in FIG. 3, the 2-D array of spots comprises two adjacent vertical columns, with each column extending substantially perpendicular to the tracks depicted horizontally, whereas in FIG. 4 the two columns have been merged into a 1D array also extending substantially perpendicular to the media tracks.

In accordance with another feature of our invention, we form an array of optical beams such that when they are focused onto the recording media, the spacing between spots is comparable to the spacing 17 between tracks of conventional recording media, e.g., 1.6 μm. Minimizing the spacing will minimize the off-axis aberrations of the focusing lens, thereby allowing use of a simple, lightweight and inexpensive lens. To accomplish the small spot spacing in a practical way, we construct the laser sources to have a comfortably large spacing, e.g., 32 μm, and have the optical system demagnify the source array by a significant factor, e.g., 20 times. Such a large demagnification is accomplished in a compact and efficient manner by the use of a microlens array.

FIG. 5 schematically illustrates one such optical system in accordance with the invention. A common substrate (not shown) supports a plurality of individual VCSELs designated $20_1$–$20_3$, each separated by a spacing equal to DX. Each VCSEL is associated with a microlens $21_1$–$21_3$ which essentially reduces the divergence of each laser beam, designated $22_1$–$22_3$. A single focussing and collecting lens doublet 23, 24 is provided to focus the three beams at the media surface or plane indicated at 8 to form three closely spaced optical spots $26_1$–$26_3$ each spaced apart by a distance equal to (1/m)DX, where m is the demagnification factor which is the inverse of the system magnification. In conventional optical memory optical systems (no microlenses), the magnification would be approximately the ratio of the numerical apertures of the focusing lens and of the collecting lens. In conventional systems, the demagnification factor is only about 2–3. Since VCSELs emit lower divergence beams, the demagnification factor would be about 5–10. When microlenses are employed, however, the demagnification can be tailored to fit the system needs, because each microlens effectively transforms the numerical aperture of the emitted beam from its original value to virtually any desired value. In FIG. 5, the microlenses 21 decrease the divergence (numerical aperture) of the emitted beams and therefore increase the demagnification factor, e.g., from 5 to 20. The use of microlens arrays to modify the optical system magnification is applicable to all of the beam array configurations discussed above (FIGS. 1–4). In the optical system of FIG. 5, many important components are left out, e.g. beam splitters and detectors, in order to illustrate more clearly the magnifying properties of the system.

The extremely small pitch of the focused beams as shown in FIGS. 3 and 4 allow the arrays to be arranged substantially perpendicular to the tracks as shown. For these two configurations, especially the linear array of FIG. 4, rotation of the image about a vertical axis (perpendicular to the emitting surface) can be employed to compensate for small imperfections in the optical system magnification which otherwise must be extremely precise. If there are 16 laser elements, for example, then a magnification would need to be accurate to less than ±0.8% for all elements to track to within ±0.1 µm. Capability to rotate the image either by rotating the optical source array or by rotating an optical element in the imaging system can therefore greatly relax the tolerances in the optical system specifications. The rotational angle can be adjusted in the manufacture and fixed, or it can be actively adjusted. For the "more 2-dimensional" configurations of FIGS. 1 and 2, rotation of the beams cannot be used to compensate for magnification errors, but it might be necessary in order to have each beam be well-aligned with a data track.

The optical recording medium 8 is movable, and may be a rotating optical disk in which case the curvature of the tracks over the array size is negligible and the tracks can be considered to be straight and parallel. The arrays of FIGS. 3 and 4 can be aligned substantially along a radial direction of the disk. See, for example, FIG. 6, with rectangle 25 representing a laser array with 4 beams $25_1$–$25_4$. Alternatively, the optical recording medium may be a moving optical tape 8 with substantially straight and parallel tracks, and the arrays of FIGS. 3 and 4 can be aligned substantially along a direction across the short dimension of the tape.

The array of laser spots are preferably produced using an array of VCSELs with one VCSEL for each spot. This approach allows both reading and writing of data and for individual correction of power emitted from the laser beam elements.

The optimum data formats in the system of the invention differ from present standard formats based on the use of a single laser element. The geometries in FIGS. 1–4, by addressing adjacent tracks, is advantageous compared to alternatives because it requires only one type of mechanical scan. The simplest scan, which also provides a continuous flow of data, uses the spiral approach of standard single-laser formats; however the spiral must be as wide in tracks as the number of laser elements simultaneously scanned. For the examples of FIGS. 1–4, the spiral width would be 16 tracks. If the lasers are fired simultaneously for writing, or are at least fired at the same average rate, then each track will read at the same rate. This property allows each track to be read either as part of a word or as an independent data stream, i.e., flexibility is maximized.

Figure 6:
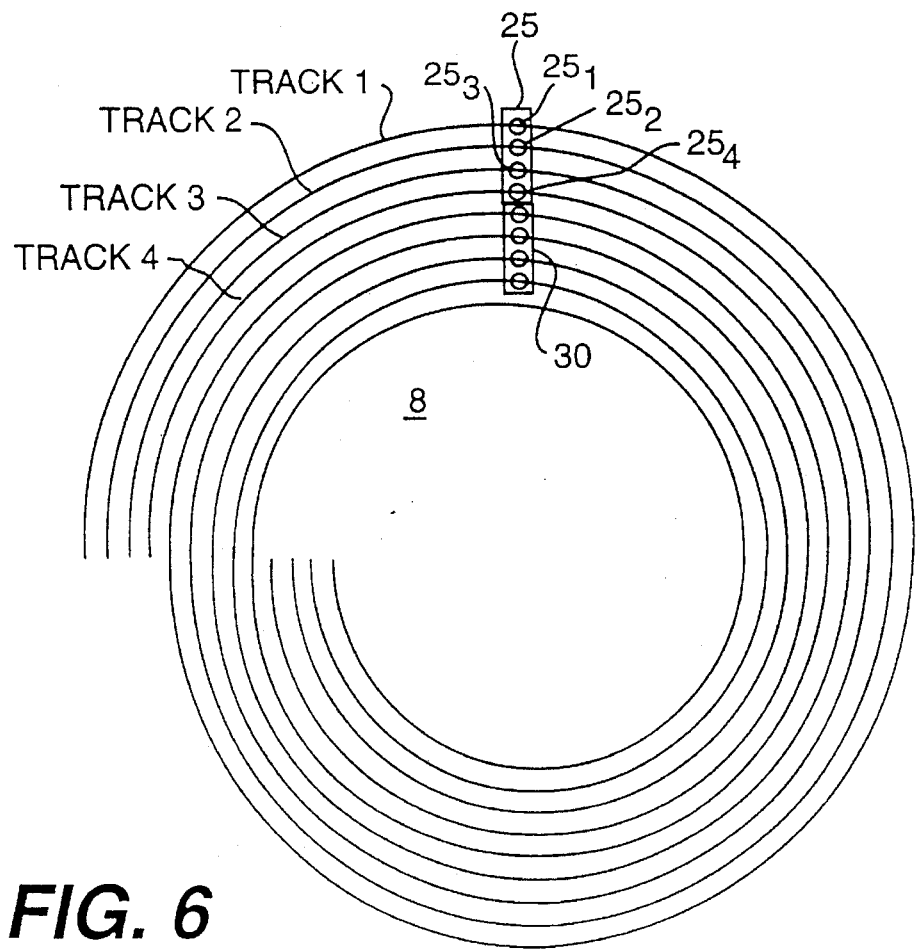
FIG. 6 illustrates continuous scanning of multiple tracks on relating media.

The "wide spiral" scan pattern for 4-bit wide addressing is illustrated in FIG. 6. As will be observed, the tracks labelled Track 1–Track 4 on the media designated 8 spiral in groups of 4 tracks. The darker line for Track 1 is used merely to make it easier to see the groupings. The grouping or swath of Tracks 1–4 are accessed simultaneously, shown by rectangle 25. The dashed rectangle 30 shows a second position of the head to access an inner swath of the tracks. The head 25 can move uniformly inward to stay continuously on the tracks and thus continuously, without interruptions, read/write data on the tracks.

In a concentric, sectorized format, the scan would have a jump for each disk rotation, each jump traversing a number of tracks equal to the number of optical beams for the addressing. For the arrays of FIGS. 1–4, each jump would be 16 tracks. A small radially-oriented gap in the data might be necessary to allow the jump to take place without data loss. For applications such as music or multimedia real-time display of the data, these interruptions could be smoothed out by using modest-sized buffer data storage in the electronics. Each swath of tracks should have the same number of bits in each track in order to simplify the software. Obviously, if the amount of data on the disk is maximized, a swath near the center of the disk will have fewer bits per rotation than a swath near the disk's outer edge. It could be advantageous to have a number of adjacent swaths have the same number of bits, with larger changes in the bit number occurring less frequently.

The use of memory buffers with appropriate electronics and software can allow the optical memory system to read or write in a variety of formats. For example, consider a conventional disk written in a concentric format with sequential data arranged circularly around the disk. The multiple beam system of this invention would read a plurality, e.g., 16, tracks in one rotation. Having memory buffers of sufficient size to store one revolution of information (times the number of tracks read) would allow this information to be rearranged to whatever format is necessary, e.g., corresponding to 16 rotations of a conventional single-beam system. The inverse of this procedure could be employed to write in alternative formats.

For small array sizes, the VCSEL array and detector array can almost be directly retrofitted into an existing optical head. As long as the array orientation and imaging system magnification are within tolerance, only one laser element of the array needs to undergo focusing and tracking adjustments. These are the standard focusing and tracking adjustments made in a single-element system. See, for example, the description given in Marchant, "Optical Recording" (referred to previously) of a conventional single-element system and the standard focusing and tracking mechanisms and adjustments, the contents of which are herein incorporated by reference. It is likely that performing focusing and tracking on two elements would be advantageous. For the arrays of FIGS. 3 and 4, this would allow automatic and rapid compensation for errors in magnification or in track pitch by rotation of the beam array. The two-element focusing would also automatically correct any tilt in the long axis of the array.

Figure 7:
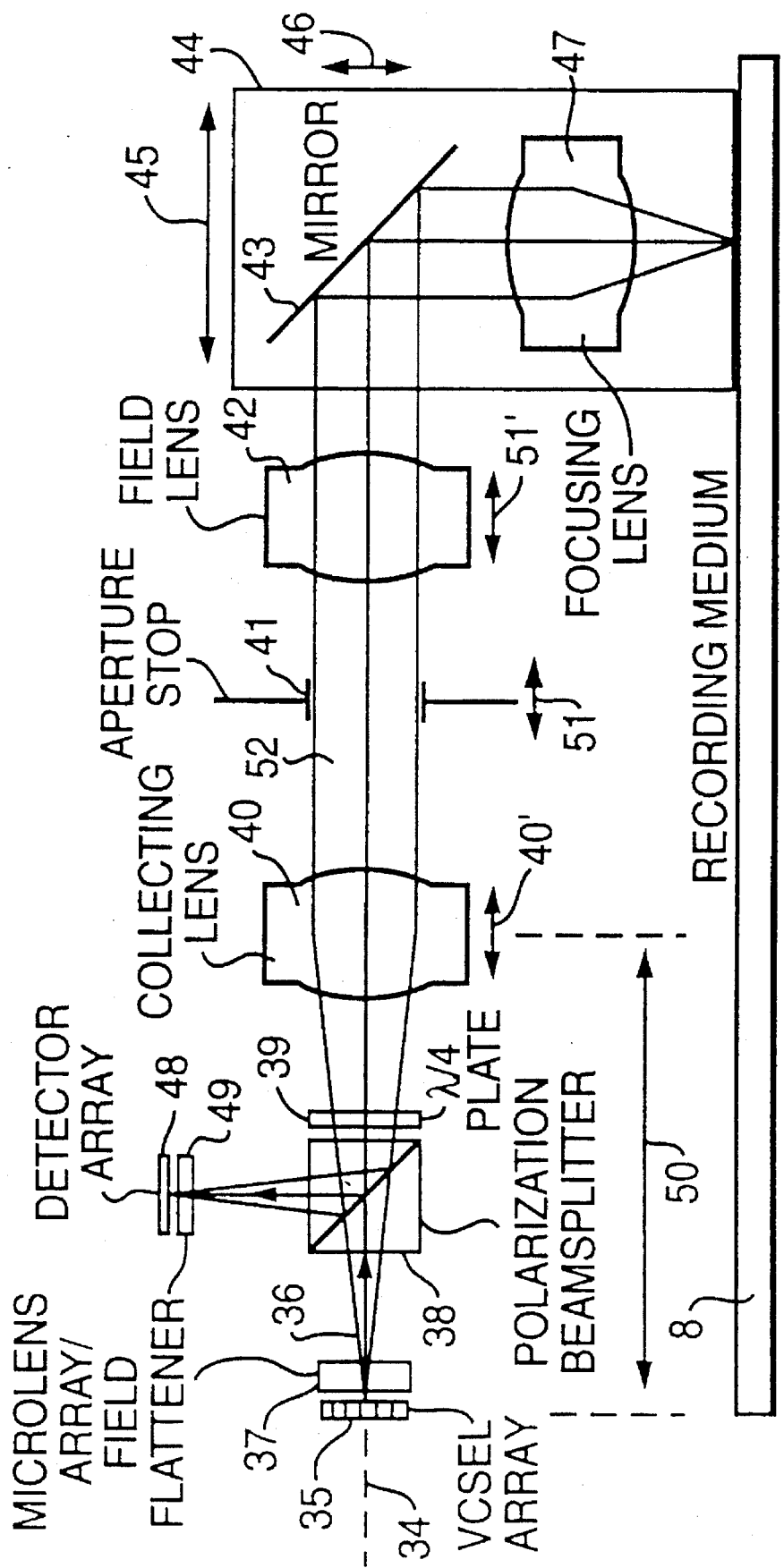
FIG. 7 is a schematic view of one form of optical system in accordance with the invention for reading multiple tracks.

An optical system similar to those in use for single laser memories but constructed in accordance with the invention is shown in FIG. 7. In this embodiment, an array 35 of VCSELs is employed. The individual beams are shown as a single beam 36 (made up of a plurality of individual beams-not shown) to illustrate that optics similar to that used in the conventional single beam head can be used with the invention. (The beams overlap each other throughout most of the system as shown in FIG. 5). A microlens array (as previously described) combined with a field flattener 37 is also employed. In the beam path is the usual polarization beamsplitter 38. The transmitted beams 39 are passed through a quarter-wave plate 39, a collecting lens 40, movable 40' axially along the beam axis for adjusting the magnification or focusing, an aperture stop 41, and a field lens 42, and is impinged on a mirror 43 mounted within a conventional housing 44 movable laterally 45 for scanning and vertically 46 for focussing with respect to the medium 8. Also within the housing 44 is the usual focusing lens 47. The reflected beams, follow the same beam path, except that they are deflected at the splitter 38 to a detector array 48. Preferably a second microlens array 49, possibly with field flattening and perhaps other optical features, focuses the beams onto the detector array 48.

Though not shown, it will be appreciated that the detector array 48 will comprise approximately the same number of discrete detector elements as there are discrete beams, with most of the detector elements oriented in the same manner as that of the laser elements in the array 35. At least some of the detector elements may be further subdivided into, for example, a quadrant of detector subelements, for use in focusing and tracking.

Figure 9:
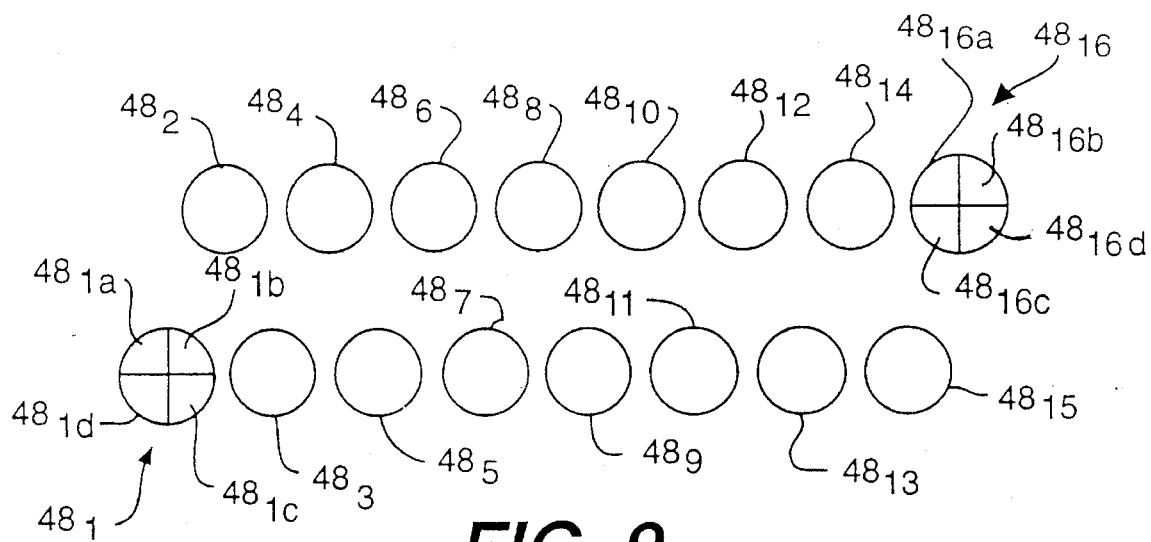
FIG. 9 shows schematically a typical detection array for use in a system according to the invention.

FIG. 9 illustrates one possible arrangement of the detector elements for the 2D array illustrated in FIG. 3. In this example, the array elements are designated $48_1$–$48_{16}$. The end elements, $48_1$ and $48_{16}$, are subdivided in four separate subelements subscripted a-d, as is known per se, and connected to known focussing and tracking circuitry (not shown) for processing the signals resulting from the location on the subelements of the return beam. Signal processing of the signals derived from each of the detector elements $48_1$–$48_{16}$ would be individually carried out. The system can also include the usual detector elements for focusing and tracking associated with the center beam of the beam array as well as with the two outermost beams of the beam array (FIG. 9), and preferably integrated with the detector array. The folding mirror 43 and focusing lens 47 are the only components which must move rapidly to access various locations on the reading disk for disk systems. It is possible to use standard components for the folding mirror 43 and focusing lens 47, implementing any necessary added complexity in the non-moving part of the system. This design approach takes advantage of the increase in data rate by using the laser array 35, but does not compromise the access time of the system. Preferably, the focusing lens comprises no more than two surfaces which deviate substantially from being flat. The system in FIG. 7 employs the polarization beamsplitter 38 and quarter-wave plate 39 to attain high optical efficiency, if needed. An advantage of an efficient optical system is that it greatly decreases the power requirements for the lasers, which is especially important for arrays. A Faraday rotator can be substituted for the quarter-wave plate 39.

Since the beam divergences from the source array 35 is quite small, especially if a microlens array 37 is used, it is possible to place the beamsplitter of FIG. 7 between the source array 35 and the collecting lens 40 as shown. This arrangement makes the system more compact. It will also make feasible direct magnification adjustment by adjusting the distance between the lasers 35 and the collecting lens 40, indicated by double arrow 50. This can be used to compensate for errors in magnification or track pitch in all the geometries of FIGS. 1–4. In the more conventional arrangement, which places the beamsplitter after the collecting lens, varying the distance between the laser array and collecting lens affects the focusing of the beams onto the detector array and thus causes focusing errors on the recording medium. In the arrangement of FIG. 7, longitudinal movement of the collecting lens 40, shown by arrows 40', can be used for magnification adjustment because the positions of the laser array 35 and detector array 48 are held fixed with respect to the beamsplitter 38. Thus, when the optical head which incorporates all the elements shown is manufactured such that focusing of the beams onto the detector array 48 corresponds to having the beams focused on the recording medium 8, the condition is preserved despite magnification adjustments.

Since the optical memory system employs an array of detectors for reading the information, there is the possibility that signals from one track will fall onto a detector element corresponding to another track. One means to eliminate this crosstalk between channels is to modulate the sources at different frequencies and to have the corresponding detector elements filter out these frequencies. The difference in frequencies between channels should be larger than the frequency at which information bits pass by. For example, for a given channel the information bits might be read about once every microsecond. One would then want about a 10 MHz difference between channel frequencies. A 2×2 array of 4 channels could have modulation frequencies of 100, 110, 120 and 130 MHz to have sufficient bandwidth separation and keep within a comfortable frequency range of the electronics. If there are more than 4 channels, redundancy in frequency is allowable so long as two channels with the same frequency modulation are not adjacent. For the two-dimensional geometries of FIGS. 1–3, four different frequencies should be sufficient; a one-dimensional array (FIG. 4) could use as little as two frequencies. Modulating the lasers at these frequencies has the added benefit of greatly reducing the effects of optical feedback into the lasers (Marchant, p.153).

Figure 11:
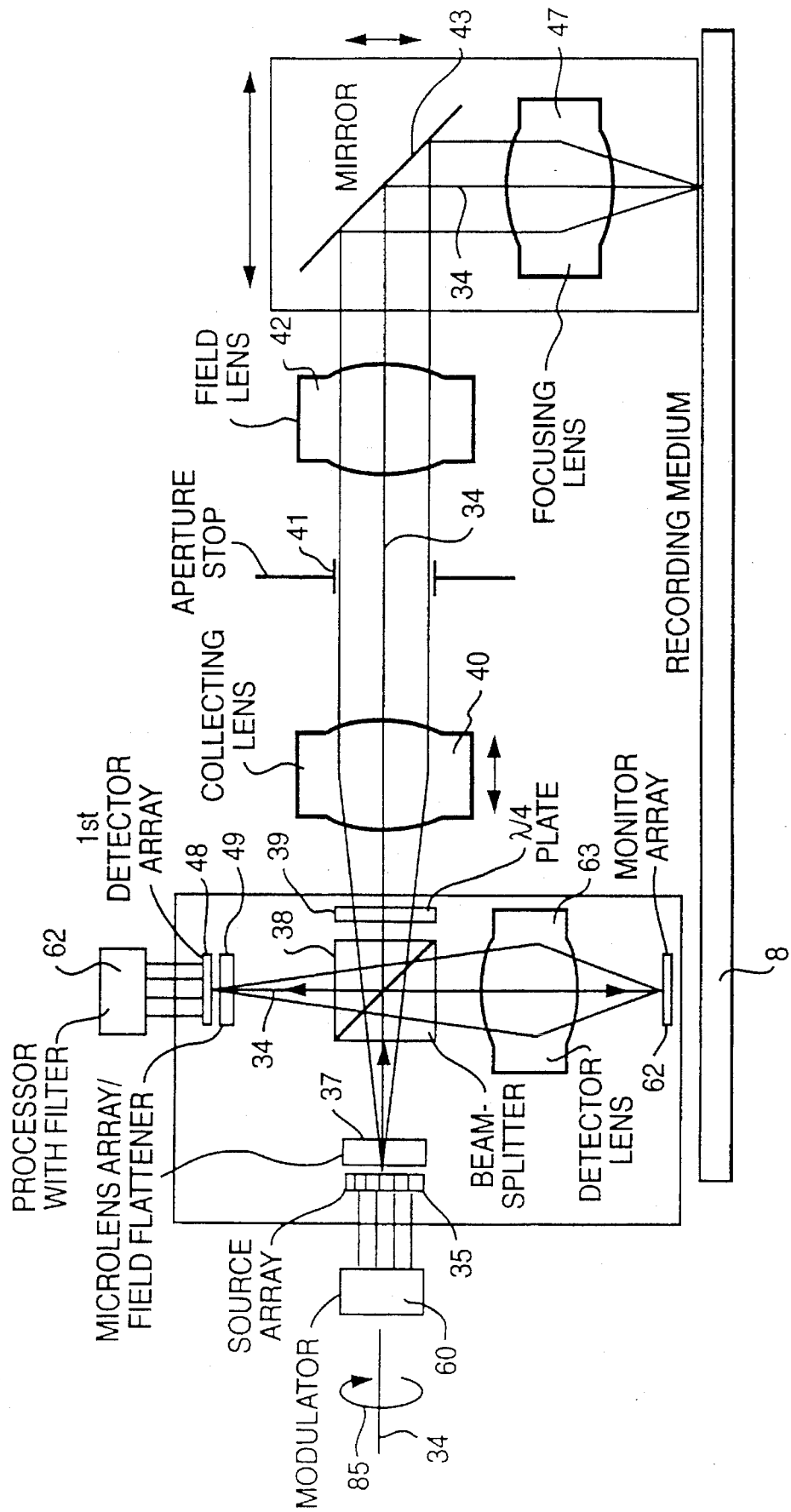
FIG. 11 shows another embodiment of a system according to the invention similar to FIG. 7.

This is illustrated in the modified system illustrated in FIG. 11, which shows a modulator 60 comprising appropriate driving circuitry for modulating the VCSEL array so as to generate the different-frequency-modulated light beams. Processing means including filters for the modulated signal frequencies is shown at 62 for the upper detector array 48.

FIG. 11 also shows at the bottom side of the splitter 38 a focusing lens 63 and a second detector array 64. The latter can be conveniently used to monitor the laser array 35, for, for example, adjusting the drive for the individual laser elements to ensure they are generating substantially constant beam powers. The remaining elements shown in the system are the same as in FIG. 7. FIG. 11 also shows by the dashed line referenced 80 a rigid mechanical interconnection between the laser array 35, lens array 37, first detector array 48, monitor lens 63 and monitor array 62, quarter-wave plate 39, and the beam splitter 38, to preserve focussing conditions despite magnification adjustments. The optical axis of the system is represented by the central ray referenced 34.

While the invention is especially adapted for use with movable optical media having closely-spaced tracks, typically 2 μm or less, because of the incorporation of a number of features of the invention, which can be used separately or together, designed to maintain the spots focussed and to properly tracking adjacent media tracks, the invention is not limited to such applications. Moreover, in the preferred embodiments it is preferred that the head scan along a line generally transverse to the tracks, e.g., along a radius of a rotating disk, or across an elongated tape.

Since standard CD disk system lenses have good correction of spherical aberration, coma and astigmatism within a field diameter of about 50 μm to 100 μm, small arrays for example, up to 75 elements, can probably use the standard CD lenses. For a 1.6 μm track pitch, the 16-element arrays of FIGS. 1 and 2 have field diameters of 28 μm, while those of FIGS. 3 and 4 have 24 μm field diameters. Beam walkoff, field curvature and distortion could cause some problems however. Since the collimated beams 52 emerging from the collecting lens 40 propagate in different directions, at some distance they will no longer overlap sufficiently to be focused by the focusing lens 47. This may or may not be a problem in the optical memory system. The standard optical approach to this problem is to use a field lens 42 (FIG. 7). The effect of refraction by field lens 42 is not shown. The field lens in this case would typically image the collecting lens 40 onto the focusing lens 47. Thus the degree of overlap at the collecting lens (before most of the walkoff occurs) would be transferred to the focusing lens, whatever the separation is between them. For an optical memory system, a different optimization is preferred. Complete overlap of the discrete optical beams does not actually occur at the collecting lens 40 (see FIG. 5) but in its focal plane opposite the laser array. Thus it is more appropriate for the field lens 42 to image this plane onto the focusing lens 47 to center all the beams on the focusing lens. Furthermore it may be preferable to make the beams overlap in the front focal plane of the focusing lens 47. In this case the system is said to be "telecentric" and has the advantage in that all of the focused beams strike the recording medium at normal incidence. The actual preferred use (or non-use) of the field lens will depend on the required system performance and constraints such as size and cost.

Field curvature could be corrected by a field flattener, shown at 37, preferably located close to the VCSEL array 35. Traditional field flatteners for optical imaging systems are essentially very low power lenses located as closely as possible to the object or image plane, preferably the latter. For the optical memory system the field flattener is most conveniently located near the source array. If a microlens array is used, it is preferable to integrate the field flattener with the microlens array, shown at 37, since they can be mass-produced as a single monolithic unit at extremely low cost by injection molding. There are at least several ways in which a field flattener can be integrated into the system. First, the focal lengths of the microlens can be varied appropriately across the array. In other word, the different positions of the laser source relative to the optical axis can be compensated by configuring the associated microlenses to have different focal lengths. A more attractive way is to replace the flat surface of the microlens array with a field flattening surface. The surface could have a continuously curved surface as in traditional field flatteners. Alternatively, since the laser array represents a small number of discrete objects, a segmented approach can be applied in which different surfaces positioned differently along the optical axis can focus the multiple beams at an approximately planar surface.

Figure 8:
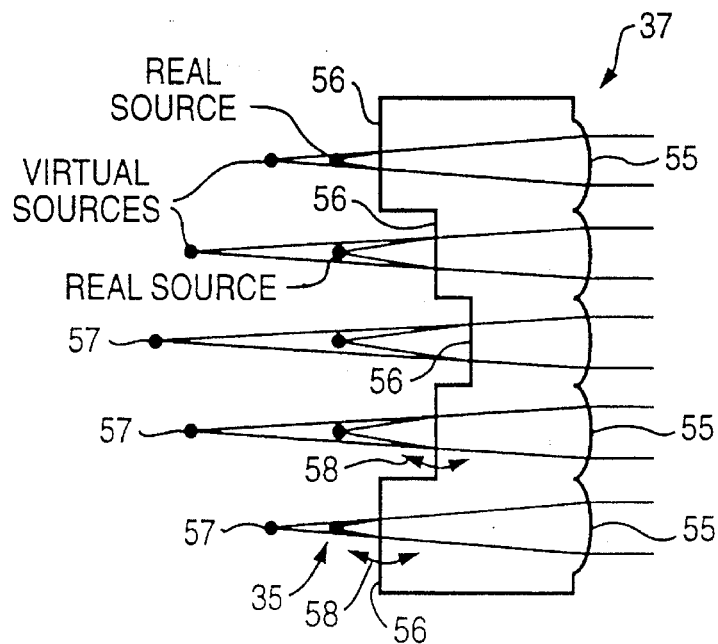
FIG. 8 is a schematic view illustrating the optical relationship between multiple beam sources and a composite lenslet system.

The segmented approach is illustrated in FIG. 8. A monolithic piece 37 containing the microlens array 55 is typically formed of plastic or glass and is shaped into segments 56 as shown on the side facing the sources 35 and refracts the light rays in accordance with well known laws of refraction. This creates virtual sources 57, as "seen" by the microlens which are shown in the figure to have a curved arrangement. Thus a focusing lens 47 having the normal sign of field curvature would focus the spots in a plane. Typically, the segment surfaces 56 would be oriented at substantially different angles as required, with the angles typically varying in the range of about 0.002°–0.1°. A given field flattener would have characteristics optimally matched to a particular optical imaging system and would not necessarily be sufficiently accurate if, for example, the focusing lens was substituted by another one of different design. For optical systems not using a microlens array it is possible to design the collecting lens 40 to have "negative" field curvature to cancel the effects of the focusing lens, although this will add expense and complexity to the lens. In the preferred arrangement, the stepped surfaces 56 would be displaced from one another in a direction substantially perpendicular to the optical axis (vertically in FIG. 8) by more than two optical wavelengths for best performance.

It is also possible to vary the diameters of the laser apertures when VCSELs are used. This approach is rather limited, however, and links the laser arrays to a particular optical system's characteristics, an undesirable feature. If the optical system includes an intermediate image plane (not shown in FIG. 7) then a field flattener can be placed near that image plane.

Figure 13:
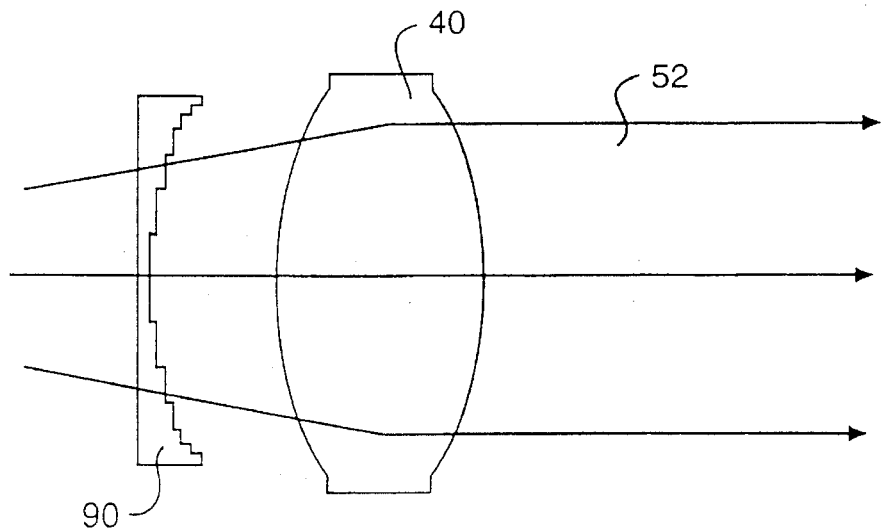
FIG. 13 illustrates a part of a modified optical system in accordance with the invention.

It is also possible to use a "staircase lens" to modify field curvature, distortion, and chromatic aberration. See, for example, the description given in Sasian and Chipman, Applied Optics, Vol. 32, No. 1, 1 Jan. 1993, pages 60–66, whose contents are herein incorporated by reference. The staircase lens could then be placed near the collecting lens 40, the field lens 42, or the focusing lens 47. It is even possible to integrate a staircase feature directly onto one or more of the surfaces of the aforementioned lens elements. FIG. 13 illustrates one possibility, with a staircase lens 90 located before the collecting lens 40, with the lines referenced 54 representing several beams of the array.

Just as field curvature can render it difficult or impossible to focus all elements simultaneously, optical distortion can make it difficult or impossible for all elements to track simultaneously. "Pre-distortion" of the laser array is one approach to compensate for the optical system distortion; however it links a particular laser array pattern with a particular system. Preferably, the field flattener of FIG. 8 can also be modified to predistort the virtual sources by tilting the flat surfaces 56 facing the sources, as indicated by arrows 58 each at its appropriate angle. Alternatively, the arrangement of the microlens elements in the microlens array can be distorted, thus predistorting the arrangement of the virtual sources such that the image through the optical system has the desired arrangement. Either of the approaches adds no additional complexity to the system. Another means for dealing with distortion is use of the aperture stop 41. Moving the aperture stop 41 (shown by arrow 51) will affect the distortion as will moving the field lens (shown by arrow 51). Distortion correction and correction for beam walkoff are primary motivations for use of the field lens. The need for distortion correction would take priority over the desire for telecentricity in the system. The field lens can also act simultaneously as the field stop, simplifying the system but constraining the positions of the lens and stop to coincide.

Figure 7A:
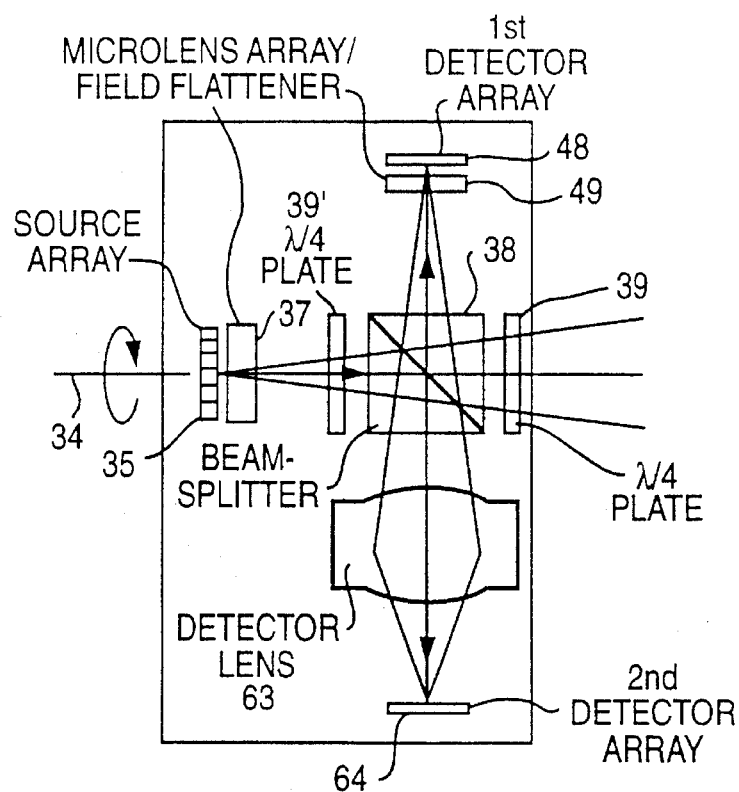
FIG. 7A schematically illustrates a modified optical system of the invention.

FIG. 7A shows a modified optical system of the invention from the source array 35 to the quarter-wave plate 39. The remainder of the system, not shown, would be the same. In the modified system, a second quarter-wave plate 39' is provided before the beam splitter 38, and a second detector array 64 with a preceding detector lens 63 (see FIG. 11) is incorporated in the system. Also, the additional microlens array and field flattener 49 is incorporated before the first detector array.

Figure 12:
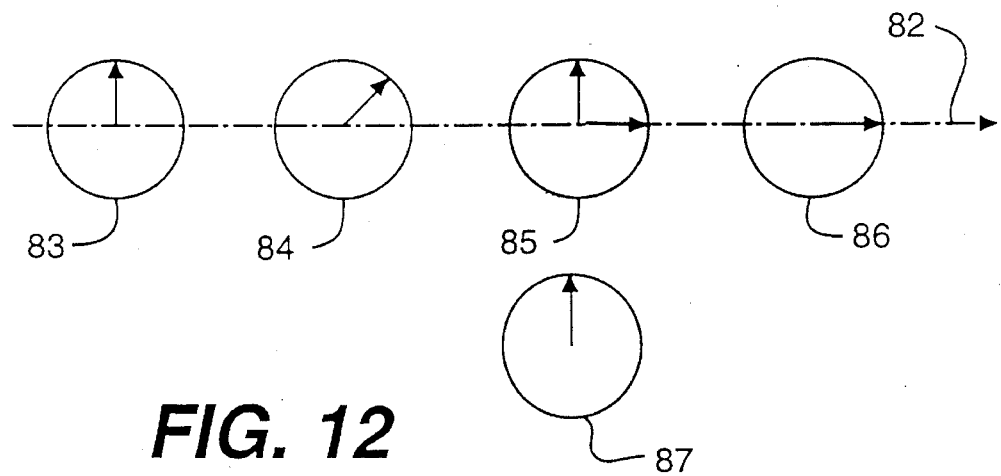
FIG. 12 shows possible polarization characteristics of a system according to the invention.

The polarization characteristics of the source array also affect the optical system layout. The preferred case is when the sources are all linearly polarized with the same orientation. Then the configuration of FIG. 7 (without the first quarter-wave plate 39) is used with high optical efficiency and minimal optical feedback into the sources. It is well known that VCSELs, when operating in the lowest order mode, are linearly polarized. Although most of the VCSELs are polarized along one crystal axis, a significant number of them are polarized in the orthogonal direction, and a few may be polarized at random orientations. For the case when the VCSEL polarizations are confined to two known orthogonal directions, the quarter-wave plate 39' between the microlens array 35 and the beamsplitter 38 of FIG. 7A can be oriented to make all the beams circularly polarized, with one polarization left-handed and the other polarization right-handed circular. One-half of the power from all the beams is then reflected by the polarization beamsplitter 38. The other half continues on to the medium. The system efficiency is then one-half as high as the one having identically polarized sources, and the sources are still isolated from optical feedback. This is illustrated in FIG. 12. The horizontal line 82 represents the optical axis, with the beams moving to the right. The circles represent polarizations of a beam at different positions in the system. The circles, normally transverse to the beam, have been rotated to face frontward for clarity. The first circle 83 illustrated a beam with one orthogonal direction of polarization before the quarter-wave plate 39', which has its axis oriented 45 degrees off the light polarization direction, illustrated at 84, to make the light circularly polarized. Circularly polarized light can also be represented as two orthogonal linear polarizations. This representation is used to show the polarization at the beamsplitter 38 and is indicated at 85. The reflected half is illustrated at 87, and the transmitted half at 86. If the beam at 83 had the other orthogonal polarization direction, the system would work the same way. The same effect can also be accomplished via a halfwave plate oriented 22.5 degrees from either of the orthogonal light polarization directions.

The same system efficiency and feedback isolation could be obtained without the additional quarter-wave plate 39' by orienting the VCSEL array 35 and the polarization beamsplitter 38 such that all the VCSEL beam polarizations are oriented at 45 degrees with respect to the beamsplitter. The same performance could also be obtained if the VCSEL beams are unpolarized, having two longitudinal modes of nearly equal power and orthogonal polarizations, or are circularly polarized, or have the polarizations rotates at a rate much faster than the rate at which data is read by each beam.

The case where the VCSEL beams are all polarized but in constant random directions is more difficult to handle. One approach uses the system of FIG. 7 without the quarter-wave plates and with the beamsplitter being insensitive to the polarization. This system is one-fourth as efficient as the one having identically polarized sources, and the sources are not well isolated from optical feedback. An alternate approach to handling beams which are polarized in constant random directions is to rotate each beam polarization to the desired orientation. One way to accomplish this is by an array of half-wave plates, each of which is rotated to the proper orientation to rotate the polarization of a particular beam as desired. Another way uses optically-active crystals, each of the proper length to rotate the polarization as desired. The half-wave plates or optically active crystals would be placed in the same location as the first quarter-wave plate 39 of FIG. 7.

The benefits of the invention are mainly achieved when the number of discrete beams varies between about 4 and 100. The smaller number simplifies the focussing requirements and optics. The larger number results in faster data transmission.

FIG. 9 showed schematically a typical detector array for use with a linear array of 16 laser beams. In this embodiment, two of the detector elements $48_1$ and $48_{16}$ are subdivided into quadrant detectors to allow them to yield focusing and tracking information by the astigmatic method as described by Marchant. For the astigamtic focusing, at least the beams impinging on the quadrant detectors should have astigmatism introduced between the beamsplitter 38 and the detector array 48 of FIG. 7.

Figure 10A:
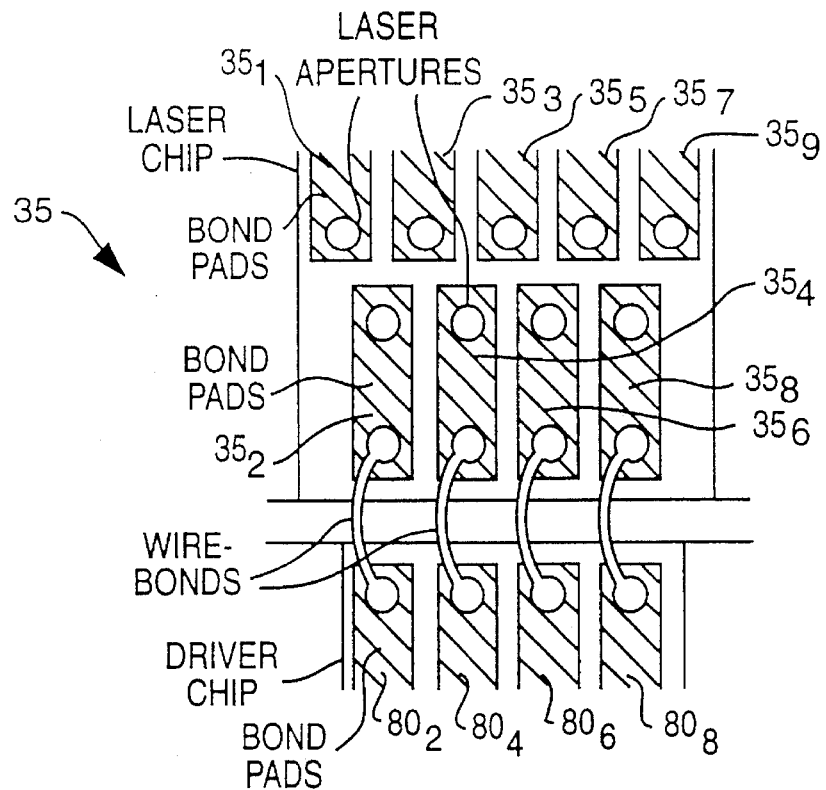
FIGS. 10A and 10B show respectively in top and side views part of one form of an array of VCSEL lasers and lenslets in accordance with the invention.
Figure 10B:
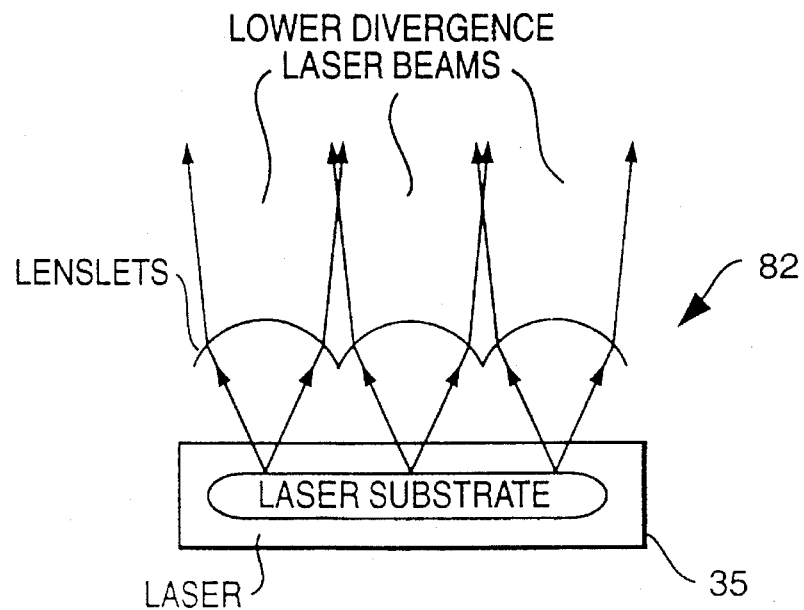

FIG. 10A shows in a top view part of a typical VCSEL array that can be used with the invention, and FIG. 10B shows in a side view an array of lower divergence laser beams generated when the VCSEL array is associated with a lenslet array. More specifically, this array, assuming 16 lasers were present, will generate the spot pattern shown in FIG. 3, and each laser element shown $35_1$–$35_9$, is powered by a separate driver, only four of which are shown, $80_2$, $80_4$, $80_6$, $80_8$. FIG. 10B shows a side view of the laser array 35 with integrated microlenses 82 which reduce the divergences of the beams in the same fashions as the microlens array of FIG. 5.

It is advantageous for all the elements to the left of the collecting lens 40 in FIG. 11 to be rigidly mounted as a single unit. The quarter-wave plate 39 can be cemented to the beamsplitter 38. The microlens array 37, if present, can be manufactured with fixtures to make easy alignment with the beamsplitter 38 on one side and the laser or detector array on the other side. The laser and detector arrays could also be manufactured with fittings to complement the fixtures on the microlens arrays. An example of this is projections from the microlens arrays (easy to manufacture especially if injection molding is used) which fit into holes etched into the laser or detector arrays. Similar approaches could be used for the detector lens and a second detector array if they are included. This kind of mounting technique provides manufacturability at low cost and good mechanical stability. The sizes of the beamsplitter, quarter-wave plate and detector lens are minimized which helps minimize costs. Furthermore it allows one to perform motions such as rotation of the laser array 35 about the axis 34, shown in FIG. 11 by arrow 85, without requiring corresponding motions of the detector array(s). Such a rotation capability is desirable for alignment of a square array or for magnification correction/compensation in a linear or quasi-linear array. In the rigid-mounted configuration the entire unit is rotated and all alignments are preserved.

VCSEL arrays integrated with lenslets are available commercially from Photonics Research Incorporated, of Boulder, Colorado. In addition, the technology for making VCSEL arrays is well known. See the previously referenced publications and patents, and the following for detailed descriptions:

(a) Laser Focus World, May 1992, pgs. 217–223;
(b) Photonics Spectra, Nov. 1992, pgs. 126–130;
(c) Scientific American, Nov. 1991, pgs. 86–94;
(d) IEEE J. Quantum Electron., June 1991, pgs. 1332–1346;
(e) U.S. Pat. No. 4,999,842.

One of us is an author or inventor of each of the foregoing references.

Optical recording with single or multiple beams is described in:

(f) Laser Focus World, July 1992, pgs. 77–84;
(g) SPIE Vol. 1499 Optical Data Storage '91, pgs. 203–208;
(h) U.S. Pat. Nos. 4,982,395; 4,884,260; 4,712,887.

All of the foregoing referenced publications are incorporated herein by reference.

Although there have been described what are at present considered to be the preferred embodiments of the invention, it will be understood that the invention may be embodied in other specific forms without departing from the essential characteristics thereof. The present embodiments are therefore to be considered in all respects as illustrative, and not restrictive. This scope of the invention is indicated by the appended claims rather than by the foregoing description.

What is claimed is:

1. An optical memory system comprising:

an optical recording medium with data arranged substantially linear and parallel tracks;

a plurality of optical sources for generating a plurality of optical beams propagating in substantially the same direction along an optical axis, said plurality of optical beams arranged in an array having at least a first and second dimension, said plurality of optical beams performing substantially identical functions for reading from or writing to said optical recording medium in a parallel fashion;

a plurality of detectors;

an optical means for collecting said optical beams, for focusing said optical beams to form close-spaced spots on said optical recording medium, for collecting said optical beams reflected or transmitted from said optical recording medium, and for directing the reflected or transmitted optical beams onto said plurality of detectors such that each of said detectors receives one of said plurality of beams and emits an electronic signal in response thereto; and means for processing the signals from said plurality of detectors;

wherein at least some of said optical beams are arranged in first and second subarrays which are substantially linear, said second subarray being offset from said first subarray by a distance equal to approximately one-half the beam separation distance in either array.

2. The optical memory system recited in claim 1, in which said optical recording medium is movable and further comprises means for causing said optical beams to scan said optical recording medium in a direction substantially transverse to said linear direction of said tracks.

3. The optical memory system recited in claim 1, in which at least two of said optical beams are focused onto adjacent tracks.

4. The optical memory system recited in claim 1, in which at least two adjacent beams of said optical beams are focused onto non-adjacent tracks.

5. The optical memory system recited in claim 1, in which said optical system further comprises a plurality of microlenses to modify the convergence or divergence of at least one of said plurality of optical beams.

6. The optical memory system recited in claim 1, in which at least some of said optical beams are arranged in a square array.

7. The optical memory system recited in claim 1, in which at least some of said optical beams are arranged in a rectangular array.

8. The optical memory system recited in claim 1, in which at least some of said optical beams are arranged in an oblique fashion.

9. The optical memory system recited in claim 1, in which the optical recording medium is a disk and the orientation of said first and second subarrays are substantially radial to said disk.

10. The optical memory system recited in claim 1, in which the optical recording medium is a tape and the orientation of said first and second subarrays are substantially along a short dimension of said tape.

11. The optical memory system recited in claim 1, further comprising means for generating, focusing and tracking information, said tracking means including at least one additional beam used exclusively for focusing and not for reading from or writhing to said optical recording medium.

12. The optical memory system recited in claim 1, further comprising means for generating, focusing and tracking information, said tracking means including at least one additional beam used exclusively for tracking and not for reading from or writing to said optical recording medium.

13. The optical memory system recited in claim 1, in which said plurality of optical sources comprises an array of independently addressable solid state lasers.

14. The optical memory system recited in claim 13, in which said optical beam generating means comprises an array of vertical- cavity surface emitting lasers.

15. The optical memory system recited in claim 14, further comprising a moveable focusing lens for focusing said plurality of optical beams onto said optical recording medium, said beam generating means comprising at least four beams for reading data, and said movable focusing lens comprising at most two surfaces which deviate substantially from being flat.

16. The optical memory system recited in claim 1, further comprising actuators for focus control and tracking control of said optical beams.

17. The optical memory system recited in claim 1, in which said plurality of optical beams are focused into said optical recording medium in a substantially planar region which is substantially parallel to said optical recording medium.

18. The optical memory system recited in claim 1, further comprising means for rotating said plurality of optical beams.

* * * * *